UNITED STATES PATENT OFFICE.

FRANK V. POOL, OF NEWARK, NEW JERSEY, ASSIGNOR TO THE CELLULOID MANUFACTURING COMPANY, OF NEW YORK, N. Y.

MANUFACTURE OF SOLUBLE NITRO-CELLULOSE.

SPECIFICATION forming part of Reissued Letters Patent No. 10,650, dated October 6, 1885.

Original No. 306,519, dated October 14, 1884. Application for reissue filed July 13, 1885. Serial No. 171,569.

*To all whom it may concern:*

Be it known that I, FRANK V. POOL, a citizen of the United States, residing at Newark, in the county of Essex and State of New Jersey, have invented certain new and useful Improvements in the Manufacture of Soluble Nitro-Cellulose, of which the following is a description.

The invention relates to the art of manufacturing what is known as "soluble nitro-cellulose;" and it consists, especially, in a process whereby the spent acids are restored by the use of nitrates and sulphuric acid, and then employed as hereinafter described.

The novelty of the process consists, chiefly, in the use of nitrates for the purpose of restoring the spent acids in bulk and using the same continuously without change, as hereinafter described.

The process of making soluble nitro-cellulose as at present conducted in its most approved form consists in, first, nitrating the fiber by means of a bath of mixed acids; second, clarifying or filtering the spent acids which have been used to accomplish the nitration of the fiber, and, third, restoring the strength of the clarified spent acids by the addition of nitric and sulphuric acid.

It has been found impracticable, in view of circumstances which need not here be recited, to so regulate the acidulous bath as to insure a perfectly-uniform product. The character of the different batches of material inevitably varies, frequently to such an extent as to interrupt the regular course of manufacture.

To obviate this source of embarrassment and loss is one of the objects of the invention, which is accomplished, as hereinbefore stated, by the use of nitrates and sulphuric acid to effect the restoration of the spent acids in bulk and their subsequent use according to methods well understood in the art.

In practice take any given quantity of spent acid, enough to supply a factory for any given period. Having collected the same in an appropriate vessel, an analysis is made whereby is ascertained the quantity of nitric acid which is necessary to effect a restoration. Having arrived at a knowledge of the necessary quantity, I add such quantity of a nitrate, either metallic, earthy, or alkaline, as will accomplish the desired object. The nitrate, being introduced, is decomposed by the sulphuric acid present in the bath, whereby the nitric acid is liberated and the strength of the bath affected accordingly. The decomposition of the nitrate of course reduces the proportion of sulphuric acid present in the bath, which percentage of sulphuric acid may be supplied at any time, either before, after, or simultaneously with the introduction of the nitrate.

It is essential that great care be exercised in making an accurate analysis and in adding the precise quantity of the nitrate that may be demanded, as any deficiency or excess in the quantity of nitrate supplied will result in an improperly-nitrated compound and consequent failure in the production of the desired object.

Having in this way restored a large quantity of the spent acid to the condition in which it is desired to use it, the same is employed continuously without variation, the spent acid resulting from the use of this lot being treated in the same manner as before, and thus a constant supply of acid of the proper standard produced.

In another application, filed by me on the 22d day of January, 1884, and bearing Serial No. 118,330, I have described and claimed a process of restoring spent acids used in the manufacture of soluble nitro-cellulose, the distinctive novelty of which consists in the use of a nitrate the base of which forms, when introduced into the bath, an insoluble compound, whereby the bath is both restored and clarified.

What I claim as my invention, and desire to secure by Letters Patent, is—

In the art of manufacturing soluble nitro-cellulose, the process herein described of restoring the spent acids, which consists in restoring their strength in bulk by the introduction of a suitable quantity of a nitrate and sulphuric acid, and employing the acidulous mixture thus restored continuously in the conversion of batches of material, substantially as described.

FRANK V. POOL.

Witnesses:
GEORGE COOK,
ARTHUR L. HENTHORN.